(12) United States Patent
Kraft et al.

(10) Patent No.: US 6,427,446 B1
(45) Date of Patent: Aug. 6, 2002

(54) LOW NOX EMISSION COMBUSTION LINER WITH CIRCUMFERENTIALLY ANGLED FILM COOLING HOLES

(75) Inventors: Robert J. Kraft, Palm City; Vincent C. Martling, West Palm Beach; Brian R. Mack, Palm City; Mark A. Minnich, West Palm Beach, all of FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 09/664,898

(22) Filed: Sep. 19, 2000

(51) Int. Cl.[7] .............................. F02C 70/18; F23R 3/06
(52) U.S. Cl. ............................ 60/737; 60/747; 60/756; 60/757
(58) Field of Search .................. 60/737, 39.36, 60/746, 747, 760, 754, 755, 756, 757

(56) References Cited

U.S. PATENT DOCUMENTS

| | | | |
|---|---|---|---|
| 4,292,801 A | * 10/1981 | Wilkes et al. | 60/747 |
| 4,984,429 A | * 1/1991 | Waslo et al. | 60/757 |
| 5,117,636 A | * 6/1992 | Bechtel, II et al. | 60/757 |
| 5,193,346 A | * 3/1993 | Kuwata et al. | 60/737 |
| 5,199,265 A | * 4/1993 | Borkowicz | 60/737 |
| 5,253,478 A | * 10/1993 | Tribault, Jr. et al. | 60/747 |
| 5,261,223 A | * 11/1993 | Foltz | 60/39.36 |
| 5,329,773 A | * 7/1994 | Myers et al. | 60/757 |
| 5,357,745 A | * 10/1994 | Probert | 60/747 |
| 5,592,819 A | * 1/1997 | Ansart et al. | 60/737 |
| 5,778,676 A | * 7/1998 | Joshi et al. | 60/737 |

* cited by examiner

*Primary Examiner*—Ted Kim
(74) *Attorney, Agent, or Firm*—Malin, Haley & DiMaggio, P.A.

(57) ABSTRACT

An improved dual-stage, dual-mode turbine combustor capable of reducing nitric oxide (NOx) emissions is disclosed. This can-annular combustor utilizes multiple, single wall sheet metal combustor liners, generally annular in shape, and each liner having multiple hole film cooling means, which includes at least one pattern of small, closely spaced film cooling holes angled sharply in the downstream direction and various circumferential angles for improved liner cooling and improved fuel/air mixing within the liner, resulting in lower NOx emissions.

6 Claims, 6 Drawing Sheets

LOW NOX EMISSION COMBUSTION LINER WITH CIRCUMFERENTIALLY ANGLED FILM COOLING HOLES

BACKGROUND OF THE INVENTION

1. Field of the Invention

This invention relates generally to an apparatus and method for reducing nitric oxide (NOx) emissions and cooling the combustion liner for a can-annular gas turbine combustion system. Specifically, an apparatus and method for introducing the cooling air into the premix chamber of the combustion system that minimizes the use of compressor discharge air for cooling the combustion liner as well as for improving the mixing of fuel and air prior to the combustion process.

2. Description of Related Art

Combustion liners are commonly used in the combustion section for most gas turbine engines. The combustion section is located between the compressor and turbine, and depending upon the application, the combustion section may not be located along the centerline of the engine, but may be located around the centerline or even perpendicular to the engine orientation. Combustor liners serve to protect the combustor casing and surrounding engine from the extremely high operating temperatures by containing the chemical reaction that occurs between the fuel and air.

Recent government emission regulations have become of great concern to both gas turbine manufacturers and operators. Of specific concern is nitric oxide (NOx) due to its contribution to air pollution. While NOx emissions are of some concern to aircraft engines, greater concerns include engine weight, performance, safety and fuel efficiency. While these concerns are shared by the industrial gas turbine engine market, NOx emissions rank as one of the greatest concerns. Utility sites have governmental permits that allow specific amounts of emissions each year. Lower emission rates, especially NOx, allow engines to run longer hours and hence generate more revenue.

It is well known that NOx formation is a function of flame temperature, air inlet temperature, residence time, and equivalence ratio. Nitric oxide emissions have been found to be lower for lower flame temperature, lower air inlet temperature, shorter residence time, and lower equivalence ratio, or a leaner fuel mixture. Lower flame temperatures and lower equivalence ratios can be accomplished by increasing the amount of air used in the combustion process, for a given amount of fuel. Further reductions in emissions can be accomplished by improving the utilization of the cooling air.

The present invention is used in a dry, low NOx gas turbine engine, which is typically used to drive electrical generators. Each combustor includes an upstream premix fuel/air chamber and a downstream, or secondary, combustion chamber, separated by a venturi having a narrow throat constriction. The present invention is concerned with improving the mixing of fuel and air in the premix zone as well as the cooling of the combustion liner to further reduce nitric oxide emissions.

Prior methods of cooling combustion liners vary extensively. U.S. Pat. No. 4,292,801 and U.S. Pat. No. 5,127,221 describe louver film cooling and transpiration cooling, respectively, for similar dual-stage, dual-mode combustors. Backside impingement cooling is described in U.S. Pat. No. 5,117,636. Though these methods of cooling have proven adequate throughout the engine operating cycle, enhancements can be made to further reduce pollutants from the combustor, while improving cooling effectiveness.

Over the years, some annular gas turbine combustor designers have incorporated angled film cooling holes, specifically for improving cooling efficiency. Typically, annular combustors are used for aircraft applications where small size and reduced weight are important design factors. Angled film cooling holes improve cooling efficiency by increasing the amount of internal surface area that is available for heat removal. For example, a hole drilled at 20 degrees to the liner wall has nearly three times as much surface area as a hole drilled normal to the liner surface. In addition, angled film cooling holes provide a jet of air to form a better film along the liner surface. In order to accomplish this improved cooling, thicker liner walls are typically required, which further increase hole surface area, hence an increase in liner weight. Examples of annular aircraft combustors utilizing this cooling technique are discussed in U.S. Pat. No. 5,233,828; U.S. Pat. No. 5,181,379; U.S. Pat. No. 5,279,127; and U.S. Pat. No. 5,261,223. This technique is also used in an annular liner dome plate as described in U.S. Pat. No. 5,307,637, and to provide differential cooling to accommodate hot spots on annular combustor liner surfaces, as discussed in U.S. Pat. No. 5,241,827.

Of greater importance to reduce NOx emission than the improved cooling is the improved mixing of the air with fuel for combustion. When cooling performance is improved, less air is typically required for cooling and more can be dedicated to fuel/air mixing. More air into the combustion process will lower fuel to air ratios and hence equivalence ratio as well as lower flame temperature, which, as explained earlier, are two key drivers of NOx emissions. The increased air for the combustion process can be delivered through the front end of the combustor with the fuel or through the cooling holes as part of the jet. The jet of air would then provide the cooling film for the liner surface as well as a jet of air to mix with the fuel prior to combustion. This increase in mixing performance can be improved further by angling the holes in the circumferential direction to induce a swirl within the combustor.

The present invention provides for improved combustor cooling while enhancing fuel/air mixture in the combustor for a dual-stage, dual-mode low NOx combustor with a dedicated premix chamber.

BRIEF SUMMARY OF THE INVENTION

An improved apparatus and method for mixing fuel and air, while at the same time cooling a gas turbine combustion liner in a can-annular low NOx gas turbine engine that includes a gas turbine combustor having a premixing chamber, a secondary combustion chamber with a venturi, described as a dual-mode, dual-stage combustor. Each gas turbine engine typically has a plurality of combustors.

In accordance with the present invention, each can-annular combustion liner is substantially cylindrical and includes an array of multiple film cooling apertures and dilution cooling apertures disposed in a predetermined array and direction of air flow, resulting in improved cooling performance on the combustion liner, while at the same time providing improved fuel and air mixture in the combustor.

The array of multiple film holes in each can-annular combustion liner includes angling each of the film cooling holes or apertures, both in an axial direction and a circumferential direction. The directionality of air flowing through the angled holes provides for a predetermined flow pattern within the combustion liner that aids in fuel/air mixing. The combustion liner apertures and holes are produced by drilling holes through the combustion liner at a predetermined angular slant in the direction of combustion flow, cold side to hot side. The predetermined strategic slanted or angled aperture is not perpendicular to the combustor wall. A predetermined angle that is in two directions, both axially and circumferentially, is selected to increase the amount of surface area of the combustion liner that is being cooled, while at the same time providing directionality of flow that greatly enhances the mixing of fuel and air. The slanted holes are drilled at a circumferential angle that is preferably in the direction of combustor swirl from the premix chamber. The diameter of each of the holes and the spacing of the holes from each other is sized to maximize the cooling effectiveness of the hole pattern, improve fuel/air mixing, while at the same time not sacrificing the structural integrity of the combustion liner.

The apparatus described in this invention may include the combustor venturi section and air cooling flow as described in U.S. patent application Ser. No. 09/605,765 entitled "Combustion Chamber/Venturi Cooling For A Low NOx Emission Combustor" assigned to the same assignee as the present invention. The combustion liner also contains a dome section, which engages the fuel nozzles and provides another means for introducing air into the combustion process.

It is an object of the present invention to reduce the nitric oxide (NOx) emissions in a gas turbine combustion system by improving fuel/air mixing and lowering flame temperature.

It is another object of the present invention to provide a can-annular low emissions combustor system having combustion liners with apertures or holes for cooling and fuel/air mixing that are slanted axially and circumferentially.

It is yet another object of the present invention to incorporate an improved venturi section that utilizes its cooling air for the combustion process, further reducing polluting emissions.

In accordance with these and other objects which will become apparent hereinafter, the instant invention will now be described with particular reference to the accompanying drawings.

DETAILED DESCRIPTION OF THE PREFERRED EMBODIMENT

Figure 1:
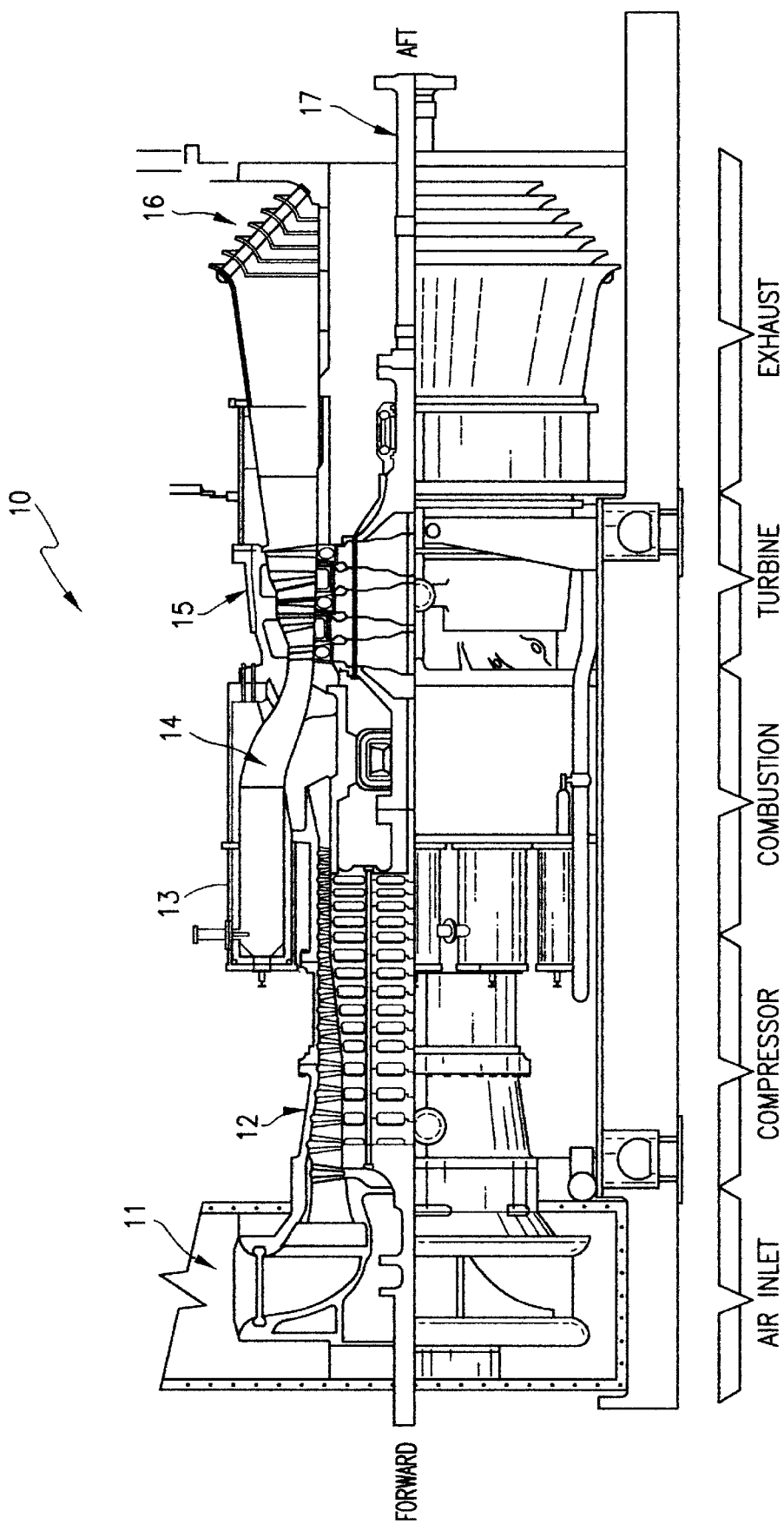
FIG. 1 shows a side elevation view in cross section of a typical gas turbine engine.

Referring to FIG. 1, an existing gas turbine engine 10 is shown. The engine is comprised of an air inlet 11, a multi-stage axial compressor 12, can-annular combustor 13, which surrounds the aft end of the compressor, combustion transition pieces 14, which direct combustion discharge gases into the turbine section, a multi-stage axial turbine 15 and exhaust plenum 16. The turbine 15, which drives compressor 12, is connected to the compressor through an axial drive shaft 17. This drive shaft is also coupled to the generator, which is not shown. The gas turbine engine 10, which is primarily used for generating electricity draws air into the system through inlet 11 and is then fed into compressor 12 where it passes through multiple stages of fixed and rotating blades. The air, which is now at a much higher pressure is directed into combustion section 13, where fuel is added and mixed with the air to form the hot gases necessary to turn turbine 15. The hot gases exit the turbine through multiple transition pieces 14, which direct the flow into turbine 15 at the proper orientation. The hot gases then pass through multiple stages of fixed and rotating airfoils in turbine 15, which may or may not be cooled by bleed air drawn off of compressor 12. The hot gases are then directed from the turbine 15 to exhaust plenum 16.

Figure 2:
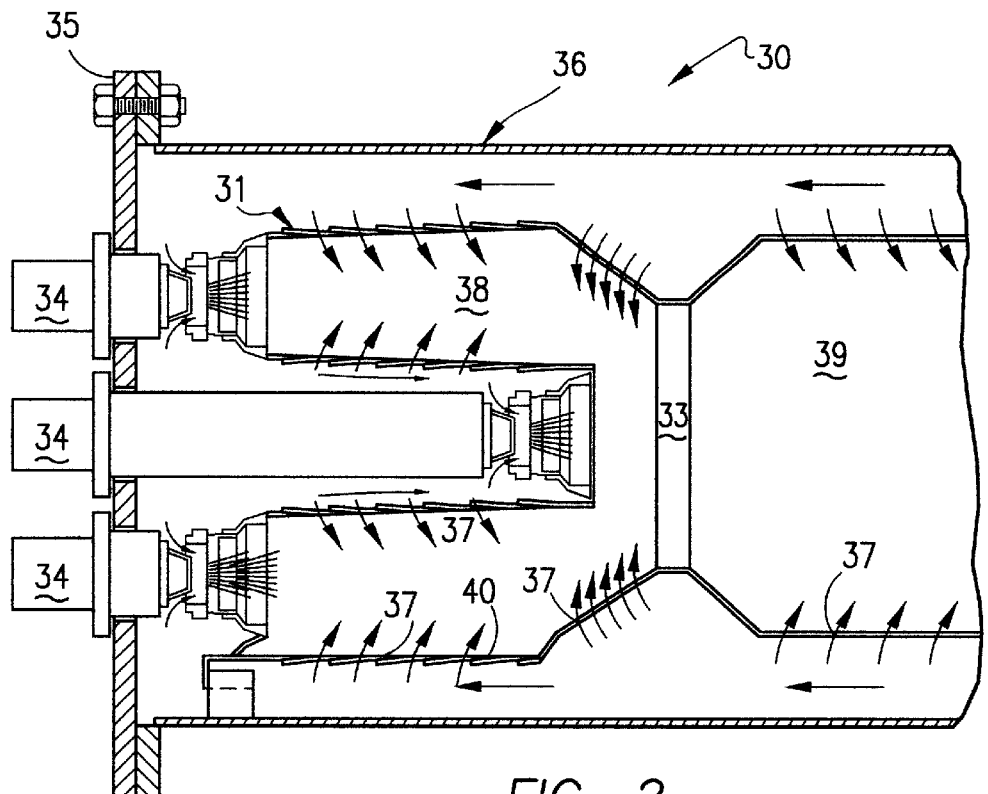
FIG. 2 shows a side elevation view in cross section of a partial gas turbine engine combustion system that represents the prior art, which utilizes louver cooling.

Referring now to FIG. 2, a portion of a gas turbine, dual stage combustion chamber 30 is shown in cross section. The combustion liner 31 is shown inside case 36 with cover 35 installed on case 36. Cover 35 includes multiple fuel nozzles 34 arranged in a circular pattern around the cover as well as a central fuel nozzle of similar configuration. The combustion liner 31 is a dual-stage combustor comprising a premix chamber 38 and a secondary combustion chamber 39. The two chambers are separated by a venturi 32 with a throat 33 for the purpose of maintaining the flame in a secondary combustion chamber 39. In this example of prior art, the liner is cooled by air passing through cooling holes 37 and directed downstream by louvers 40. Louvers provide a rigid surface that results in increased liner structural integrity, while providing a means of directing the cooling air downstream. Louver cooling, also known as rolled ring or splash cooling, bleeds air through small rows of holes 37 in liner wall 31, and directs it along the liner wall surface by means of an internal deflector, or louver 40. Drawbacks to this configuration include steep temperature gradients between the metal surrounding the cooling air and the louver edge because the air from the previous row of cooling holes has lost its effectiveness. This thermal problem can produce high stresses in the liner shell resulting in cracking and extreme coating degradation.

Figure 3:
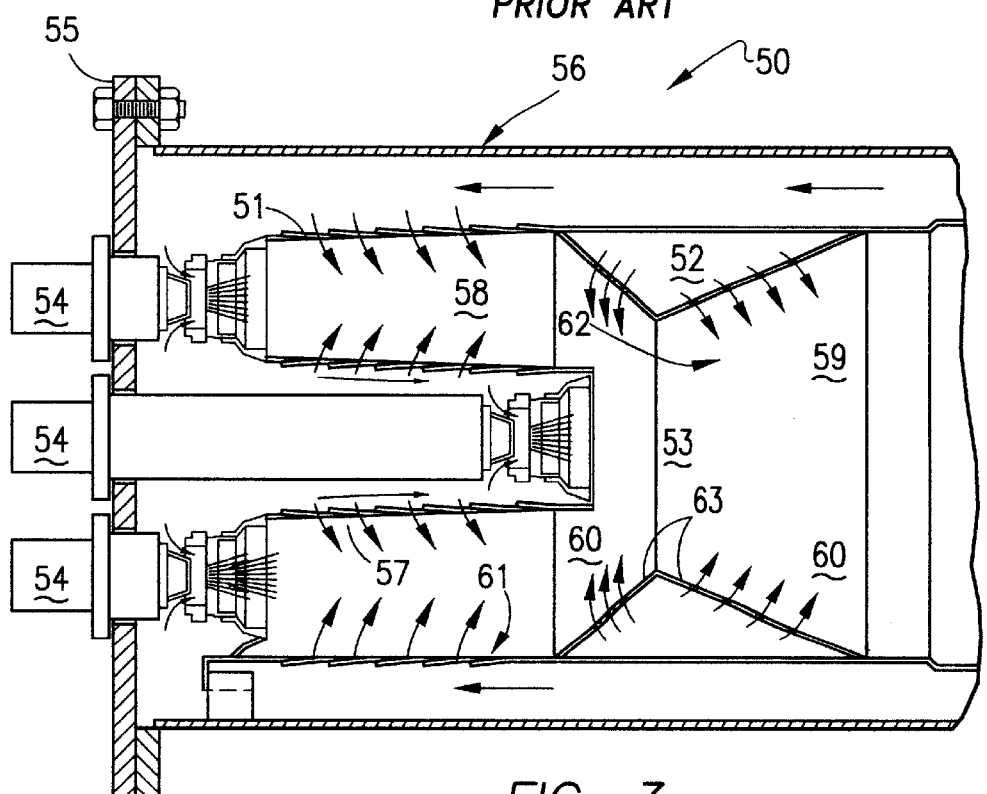
FIG. 3 shows a side elevation view in cross section of a partial gas turbine engine combustion system that represents the prior art, which utilizes transpiration cooling.

A similar combustor, and another form of prior art, is shown in FIG. 3. Again, a combustion liner 51 is shown for a dual-stage combustor comprising a premix chamber 58 and a secondary combustion chamber 59. The two chambers are separated by a venturi 52. All other features are similar to those described in FIG. 2, with the exception of the cooling method for venturi 52. Louver cooling is utilized in premix chamber 58 by way of cooling apertures 57 and deflectors 61. The venturi 52 is cooled by transpiration cooling instead of louver cooling as shown in FIG. 2. In transpiration cooling, air or another cooling fluid passes through a porous structure, such as the venturi walls 63 into the venturi boundary layer on the hot gas path 62. This allows the venturi inner wall 63 metal temperature to be maintained under that of the gas path 62. Cooling of venturi 52 is accomplished by the absorption of heat from venturi walls 63 and by altering the boundary layer along venturi flowpath 62. In order to provide adequate transpiration cooling, material for the venturi walls is typically composed of a porous metal laminate such as Lamilloy. A major drawback to this cooling method is the availability of porous materials required to provide adequate heat transfer and extended durability of these materials.

Figure 4:
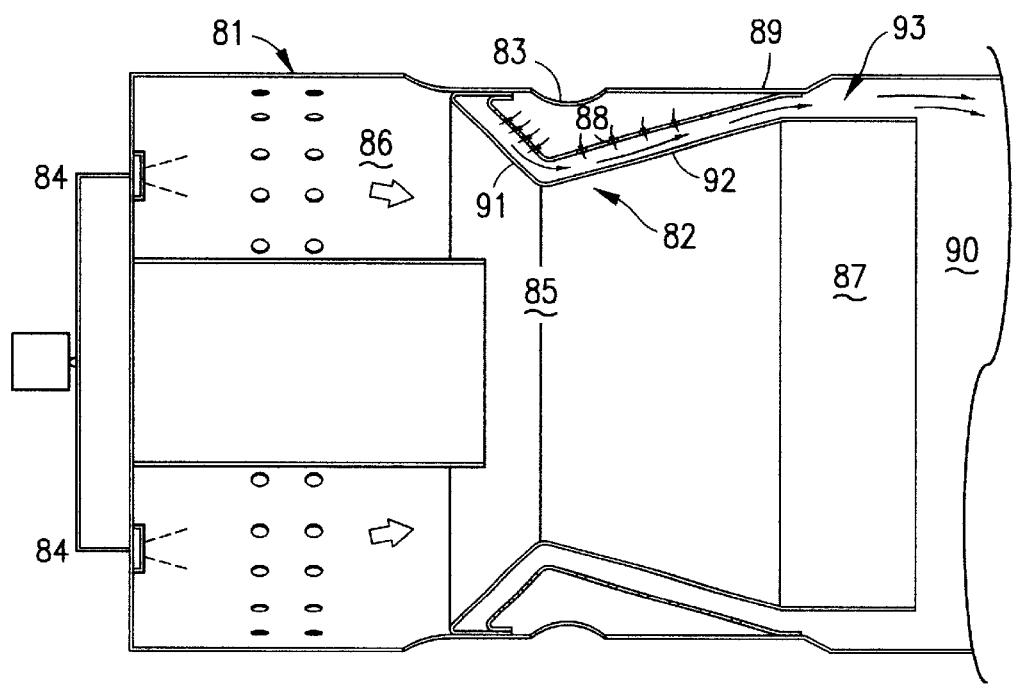
FIG. 4 shows a side elevation view in cross section of a partial gas turbine engine combustion system that represents the prior art, which utilizes impingement cooling.

Referring now to FIG. 4, a similar dual-stage combustion chamber that utilizes impingement cooling is shown. Again, a combustion liner 81 is shown for a dual-stage combustor comprising a premix chamber 86 and a secondary combustion chamber 87. The two chambers are separated by a venturi 82 with a narrow throat 85. Other features are similar to those described and detailed in FIGS. 2 and 3. The focus of this example of prior art is the cooling method of venturi 82. The premix section is cooled with louvers (not shown) as described in FIG. 2. Venturi 82 is cooled by impingement of air from outside the liner shell along the backside of the venturi flowpath walls 91 and 92. Cooling air enters the venturi section through apertures 83 in liner 81. The air then passes through multiple rows of holes 88 and impinges on the backside of venturi gas path walls 91 and 92. The cooling air then travels downstream through channel 93 and enters the dilution zone 90 of combustion liner 81 as film cooling. Though this cooling method has proven adequate, the major drawback to this configuration is the requirement for double wall construction to create the impingement jets, hence an increased cost and weight, as well as the extreme temperature differences created between the two venturi walls resulting in differential thermal expansion that can lead to buckling. In addition, combustion efficiency is somewhat lower due to the cooling being discharged into the dilution zone aft of the combustion region.

Figure 5:
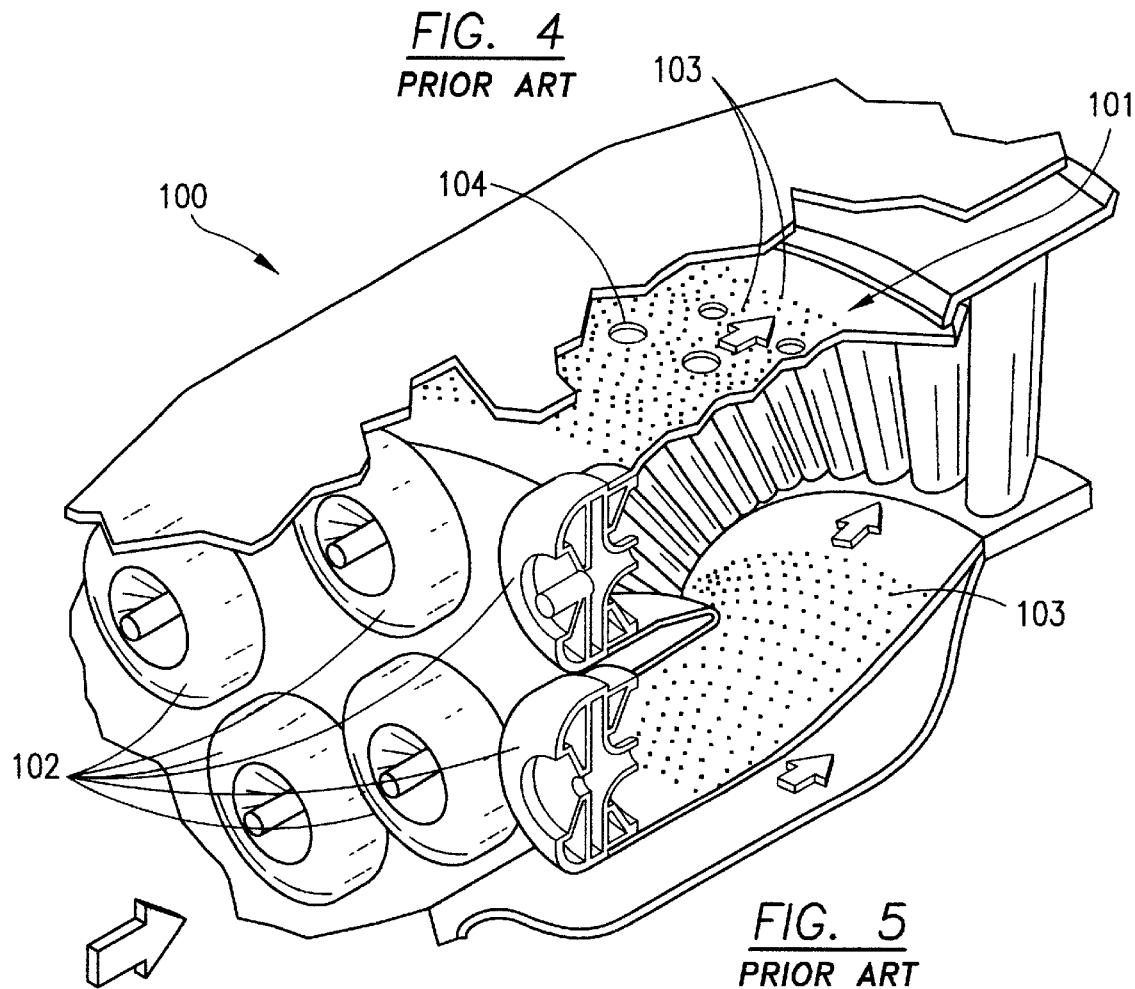
FIG. 5 shows a perspective view in partial cross section of an annular aircraft gas turbine combustion system that represents prior art, which utilizes film cooling.
Figure 6:
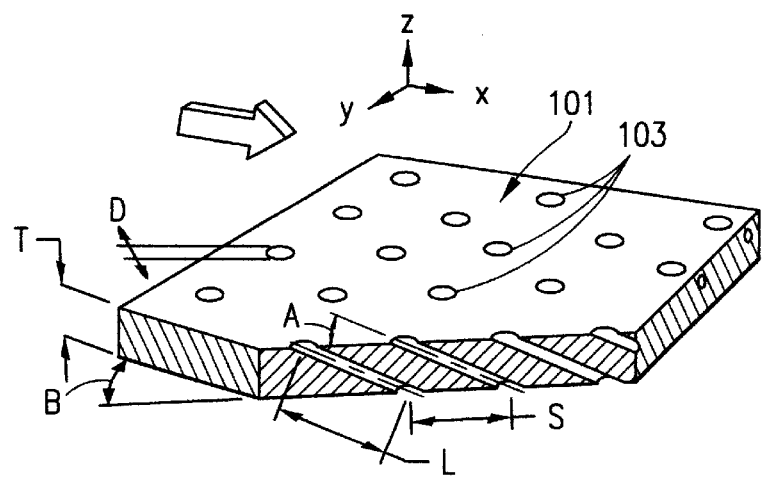
FIG. 6 shows a perspective view in partial cross section of an annular aircraft gas combustor that represents prior art, which utilizes film cooling.
Figure 7:
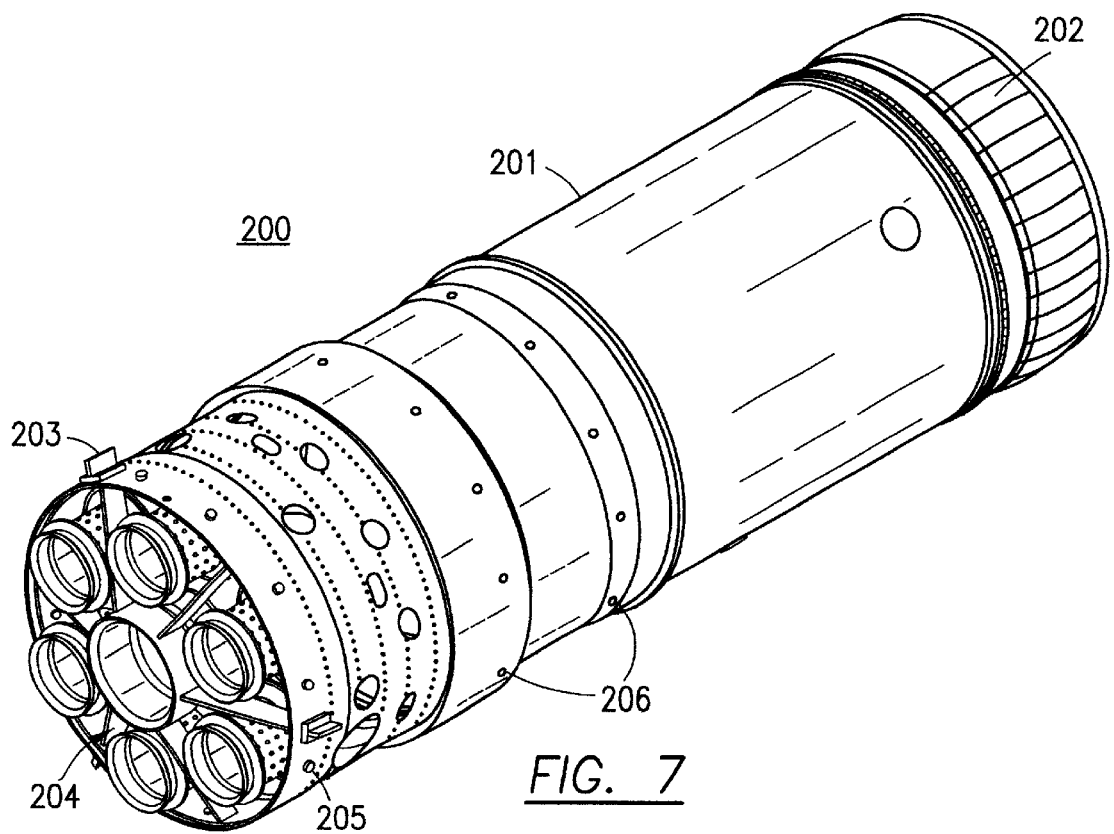
FIG. 7 shows a gas turbine combustion liner in perspective view in accordance with the present invention.

FIG. 5 shows an annular aircraft combustor 100 that utilizes angled film cooling holes for the purpose of improving cooling effectiveness of liner 101. Multiple fuel nozzles 102 are incorporated in combustion liner 101. Multiple rows of angled cooling holes 103 are located on the inner and outer liner skin. In addition, larger dilution holes 104 are located further downstream in the liner. A close-up view in cross section of this liner surface is shown in FIG. 6. For the purpose of more effective liner cooling, an array of cooling holes 103 are drilled a diameter D at an axial angle A relative to the liner skin. The resulting hole is length L. Drilling holes at an angle relative to the flow path provides increased internal surface area for heat removal as well as providing a better layer of film cooling. Holes are spaced a predetermined distance S apart. The holes are also drilled at a tangential angle B to induce a swirl.

The present invention is disclosed in FIGS. 7, 8, 9, and 10. The combustion liner assembly 200 is a dual-stage, dual-mode low nitric oxide (NOx) combustor composed of outer liner 201, dome cap assembly 204, and a venturi, which is not visible in FIG. 7. Liner 201 is held in the combustion system by forward locating tabs 203 and an aft spring seal 202. The dome cap assembly 204 is held in outer liner 201 by pins 205. The venturi (not shown in FIG. 7) is held in place in outer liner 201 by two rows of pins 206. The liner shell 201 has a number of apertures at the forward end for cooling the liner wall and premixing of fuel and air for combustion. The dome cap assembly and venturi are shown in greater detail in FIGS. 8 and 9.

Figure 8:
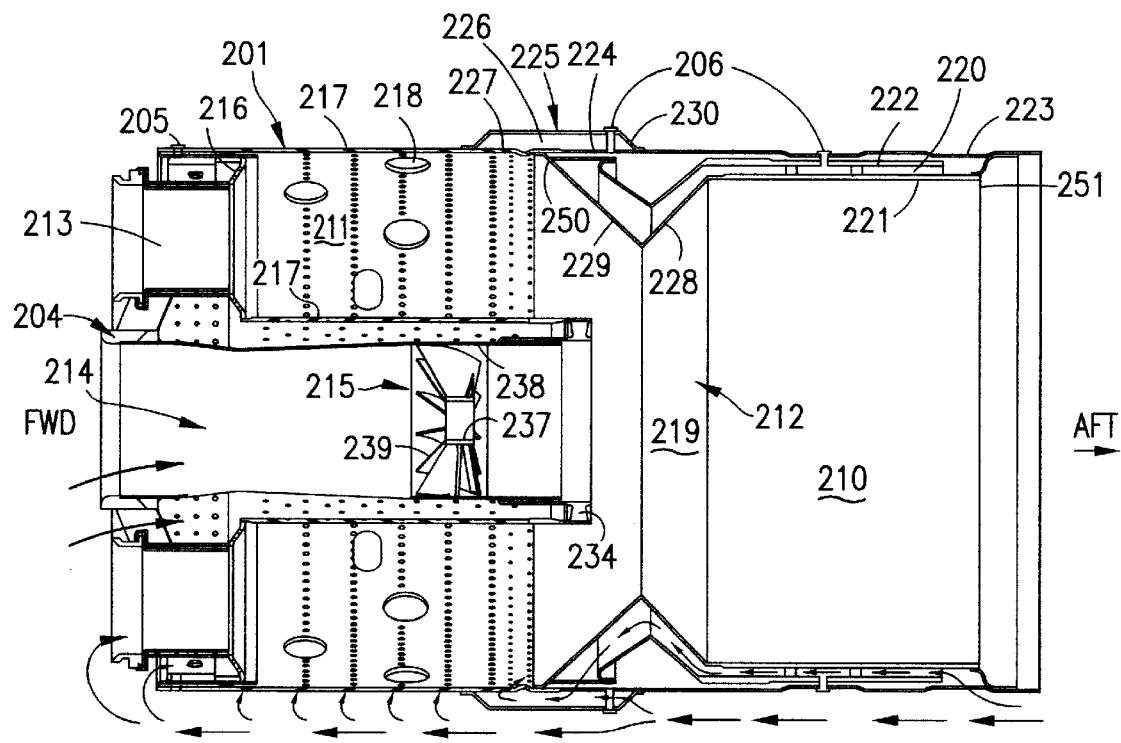
FIG. 8 shows a side elevation view in cross section of a partial gas turbine combustion liner in accordance with the present invention.
Figure 9:
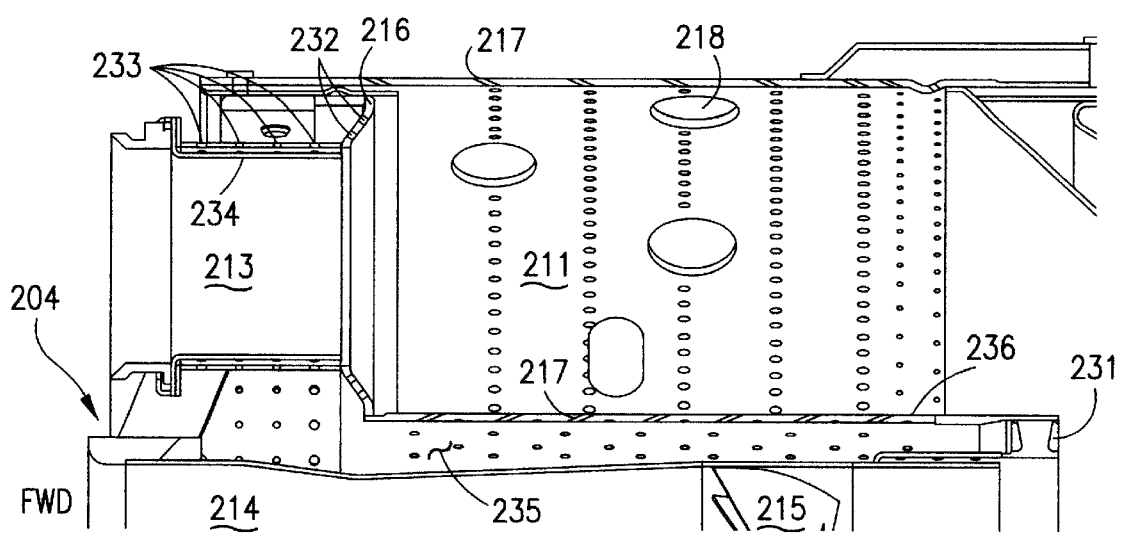
FIG. 9 shows greater detail of a side elevation view in cross section of a partial gas turbine combustion liner in accordance with the present invention.

FIG. 8 shows a partial cross-section of the present invention. Again, liner shell 201 is shown with dome cap assembly 204 installed by pins 205 and venturi 212 installed via pins 206. The dual-stage combustor is comprised of premix chamber 211 and secondary combustion chamber 210. The dome cap assembly's primary features include openings 213 for multiple fuel nozzles located around the combustor centerline, with an additional opening 214 along the combustor centerline for a secondary fuel nozzle. This center opening 214 includes a swirler 215. The multiple fuel nozzle receptacles 213 engage a formed dome 216, which serves as a regulator for controlling the amount of air that enters the combustor. Venturi 212 is a separate component formed of numerous sheet metal pieces with the purpose of forming the secondary combustion chamber 210 and a narrow constriction or throat 219 that maintains the flame in secondary combustion chamber 210. The venturi has a built-in cooling channel 220 that is formed by two cylindrical inner and outer walls, 221 and 222, respectively, as well as a forward end 250 and an aft end 251. The venturi, its cooling circuit, and basic operation are discussed in detail in U.S. patent application Ser. No. 09/605,765, filed Jun. 28, 2000, entitled "Combustion Chamber/Venturi Cooling for a Low NOx Emission Combustor," assigned to the same assignee as the present invention and incorporated herein by reference.

The basic cooling air flow path is shown in the lower half of FIG. 8, where cooling air flow direction is represented by arrows. The cooling air travels towards the forward end of combustion liner 201. A predetermined amount of cooling air enters cooling channel 220 through holes 223 in liner 201. Cooling air travels upstream through channel 220 to the leading edge of venturi 212 and exits the venturi through matched holes 224 in the venturi outer skin and liner 201. The cooling air, which has been preheated as a result of cooling the venturi inner walls 221, 228, and 229, enters an annular cavity 226 formed by a belly band 225 around liner 201. Due to the pressure loss along cooling channel 220, additional cooling air is supplied to annular cavity 226 by resupply holes 230. The cooling air, now at a higher pressure is directed out of annular cavity 226 through multiple rows of angled holes 227. This air is then premixed with the fuel and air in premix chamber 211 and used in the combustion process in secondary combustion chamber 210.

The remainder of the cooling air that is not utilized in cooling venturi 212 is carried upstream to premix chamber 211. For clarity purposes, this region is enlarged and shown in FIG. 9. Air used for effusion cooling is channeled into premix chamber 211 through multiple rows of angled film cooling holes 217 where it forms a cooling film along liner shell 201 and due to its high velocity, penetrates the boundary layer to mix with the previously discharged fuel and air prior to combustion. Cooling holes 217 are angled such that air entering the combustor from the holes is directed towards the combustion chamber. These angled film cooling holes may also be angled tangentially with respect to the combustor centerline to impart a swirling component to the cooling air as explained below (see FIG. 10). Additional air is introduced to the premix chamber through dilution holes 218 for mixing with the upstream fuel and air. The remaining air travels upstream to the forward end of liner 201 and is introduced through one of four regions. Air can enter premix zone 211 through multiple rows of angled film cooling holes 232 in dome plate 216. These holes may be angled in a tangential direction relative to the combustor centerline to impart swirl in the cooling air. A portion of the air dedicated for dome plate 216 is used to cool the nozzle tubes 234 by way of impingement cooling. Cooling air impinges upon the backside of nozzle tubes 234 through impingement holes 233 and is then directed downstream into premix chamber 211. The second air route is through nozzle tube 234 located within aperture 213. The air passing through this region travels through the fuel nozzle air swirler (not shown) where it is premixed with fuel prior to entering premix chamber 211. The third passage for air entering the combustion system through the dome cap assembly is through an inner substantially cylindrical tube 214 and swirler 215, which is located within inner tube 214. The swirler is comprised of inner and outer cylindrical tubes 237 and 238, respectively. Joining these concentric tubes is an array of angled vanes 239. This air will mix with the fuel and air of the secondary fuel nozzle (not shown) and exit into the secondary combustion chamber 210. The fourth method and structure for introducing air into the premix chamber is through cavity 235 formed by inner tube 214 and an outer tube 236, which are co-axial. Air exits channel 235 through multiple rows of angled film cooling holes 217 in outer center tube 236 or through an aft swirler 231, which is co-axial to swirler 215, and discharges the air into secondary combustion chamber 210. Again, the angled holes 217 direct cooling air towards the combustion chamber and may be angled circumferentially as well, depending upon the application.

Figure 10:
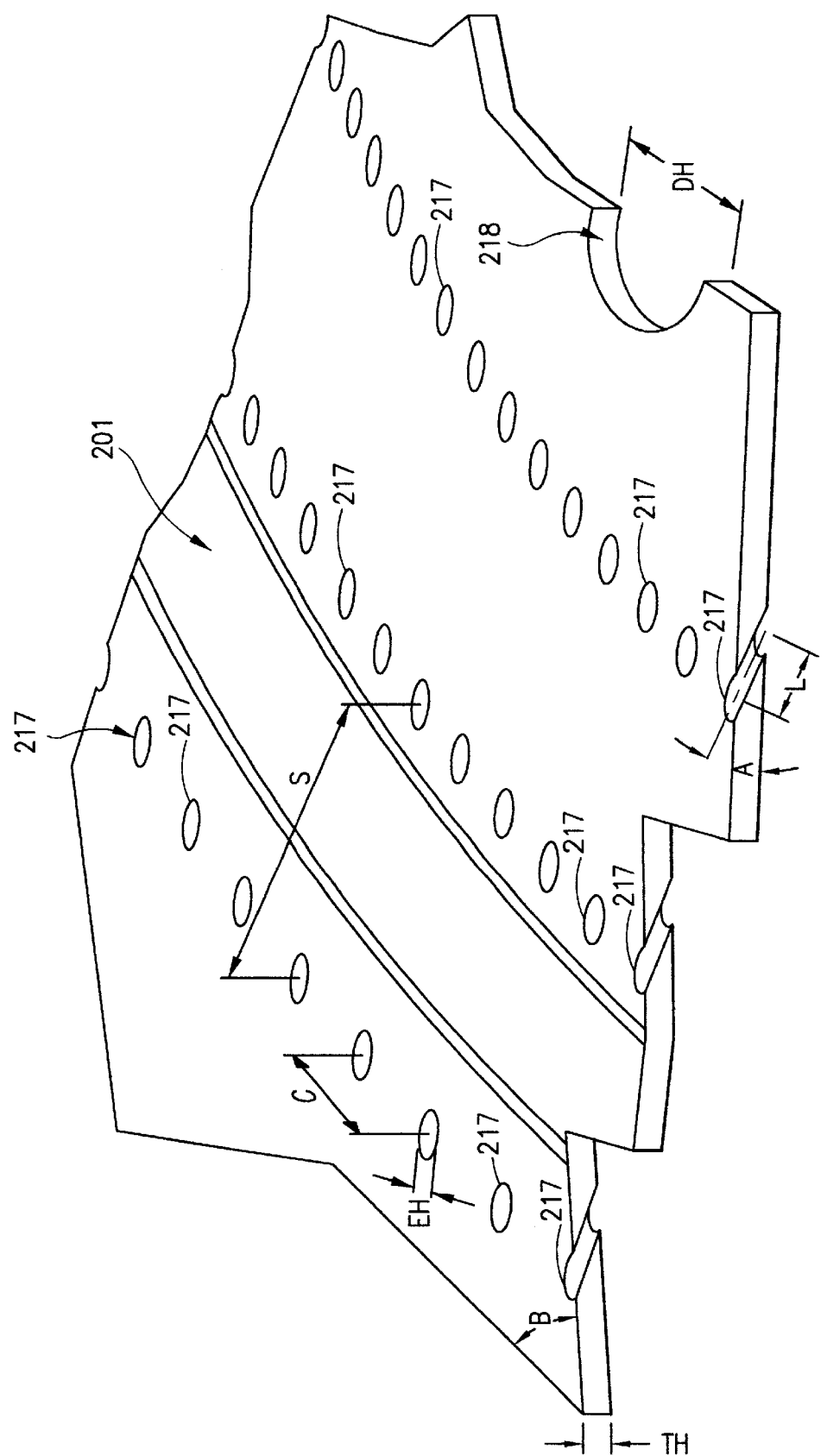
FIG. 10 shows a perspective view, partially cut away, of the premix chamber wall having angled film cooling holes in accordance with the present invention.

The premix chamber liner shell 201 cooling hole pattern utilized on the present invention is shown in greater detail in a cross-sectional view of premix chamber liner shell 201 as in FIG. 10. The cooling holes 217 (all the holes shown in FIG. 10 except hole 218) are angled both towards the combustion chamber and circumferentially in order to increase cooling surface area and to induce swirl within the premix chamber, hence improving fuel and air mixing, which will result in lower emissions. Typical combustor liner wall thickness for effusion cooling is thicker than combustors shown in the prior art, with wall thickness at a minimum of 0.0625", ranging up to 0.25". The liner wall is laser drilled with a specified pattern of cooling holes 217 and dilution holes 218. Typical effusion cooling hole diameters EH can range from 0.015" to 0.125", while dilution hole DH diameters can range from 0.4" to 1.5" as well. Diffusion hole 218 is typically drilled normal to liner shell 201, while effusion holes 217 are drilled at an angle A relative to the premix chamber centerline axis, where angle A can range from 15 deg to 60 deg from centerline. Drilling these holes at such an angle will result in cooling hole length L, which is a function of angle A. In order to induce swirl within the combustor, which will improve overall mixing of fuel and air, the cooling holes are also drilled at a circumferential angle B, which typically ranges from 15–60 degrees. The cooling holes are spaced apart a circumferential distance C and an axial distance S. These distances are specifically calculated depending upon the application and operating conditions to ensure that the proper amount of cooling air is applied to liner shell 201 for cooling purposes.

Operation of the dual-stage, dual-mode combustor disclosed in the present invention is similar to those of similar configuration where ignition is established in the primary zone, or premix chamber, first. Upon confirmation of a steady flame in primary or premix zone 211, the fuel circuits are opened to the secondary fuel system (not shown) located within center body 214 and flame is established in secondary combustion chamber 210, aft of venturi throat 219. Upon confirmation of flame in the secondary combustion chamber 210, the fuel supply is gradually reduced to the primary fuel nozzles in nozzle tubes 234 until the flame is extinguished, while fuel supply to the secondary fuel system (not shown) is increased in order to transfer all flame to the secondary combustion chamber 210. Fuel supply is gradually increased to the primary fuel nozzles (not shown) to create a premix of fuel and air in premix chamber 211 while fuel to the secondary system is decreased. This premix fuel and air in the primary premix chamber travels downstream to the secondary combustion chamber where ignition occurs.

The benefits to the present invention are numerous over similar hardware configurations. The angled cooling holes in premix chamber liner 201 provide for improving the film cooling effectiveness along the liner skin as well as allowing the cooling air to penetrate the gas path and mix more completely with the fuel within the premix chamber. This configuration is advantageous for an industrial application where increased weight from thicker liner walls is not a primary concern but improved emission is critical. The angled cooling holes by design do not require as much cooling air, so air originally designated for liner cooling can now be introduced further upstream in the premixing process. This extra air introduced further upstream in the liner pushes the fuel/air ratio lower and lowers the flame temperature by allowing for a longer mixing period, hence more complete mixing. These are both key elements that lower NOx levels. A further element to lower NOx emissions of the liner is to introduce the venturi cooling air into the combustion process, which will further reduce the fuel to air ratio and flame temperature, again lowering the resulting NOx levels. This can be accomplished by utilizing the improvements disclosed in U.S. patent application Ser. No. 09/605,765 entitled "Combustion Chamber/Venturi Cooling for a Low NOx Emission Combustor" assigned to the same assignee as the present invention. By reintroducing the cooling air from the venturi into the combustion process in combination with improving the upstream mixing pattern and increasing air flow into the premixing process, overall NOx emissions are substantially reduced.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An improved low emission combustor for use with a gas turbine engine comprising:

a substantially cylindrical combustor liner comprising a premix chamber for mixing fuel and air, and a combustion chamber positioned downstream of said premix chamber and in communication therewith for the combustion of said fuel and air, said combustion liner premix chamber containing multiple rows of angled film cooling holes and multiple rows of dilution holes for the purpose of liner cooling and fuel to air mixing within said premix chamber, where cooling holes are angled towards said combustion chamber, cold side to hot side;

a venturi containing a cooling channel containing at least one inlet and at least one exit aperture for cooling air, said cooling channel is configured to feed cooling air into said liner forward of said downstream combustion chamber and;

a combustor dome cap assembly containing receptacles for multiple fuel nozzles and for regulating the amount of air introduced into the premix chamber, said dome cap assembly comprising:

a circular dome plate with an array of apertures located around the center line of the combustor for the purpose of engaging fuel nozzles;

said dome plate containing multiple rows of angled film cooling holes angled in a tangential direction cold side to hot side with the intent of imparting swirl into the air flow;

a center hole in said dome plate with inner and outer co-axial, substantially cylindrical tubes extending through said center hole, each tube containing a co-axial tangential swirler for mixing fuel and air;

multiple cylindrical nozzle tubes fixed to said dome plate at each of said apertures for engaging fuel nozzles, said multiple cylindrical nozzle tubes in a circular array about said inner and outer co-axial substantially cylindrical tubes;

means for cooling said nozzle tubes;

said outer co-axial substantially cylindrical tube contains multiple rows of angled film cooling holes that are angled in the axial direction, cold side to hot side.

2. The low emission combustor of claim 1, wherein said venturi assembly is a separable assembly from said liner comprising:

an inner and outer, generally annular wall, that includes converging and diverging lower portions positioned downstream of said premix chamber and in communication with said combustion chamber; said venturi containing a throat portion, a forward end, and an aft end;

a wall concentrically disposed around said venturi walls forming a passageway having at least one entrance and one exit for cooling air;

a blocking ring fixed to said aft end of the venturi for preventing leakage of cooling air into the combustion chamber;

said cooling air inlet being downstream of venturi throat and said cooling air exit being upstream of venturi throat such that the cooling air for the venturi passageway flows in a direction opposite to combustor gas flowpath and the cooling air from the venturi passageway is preheated and introduced into the premix chamber thereby increasing the combustor efficiency.

3. The combustor of claim 1 wherein angled film cooling holes of the liner and dome cap assembly are angled in the axial direction cold side to hot side in a range of 15–60 degrees from the liner surface.

4. The combustor of claim 1 wherein angled film cooling holes of the liner and dome cap assembly are angled tangentially relative to the flowpath, cold side to hot side at an angle of 15–60 degrees from the axial direction.

5. The combustor of claim 4 wherein the tangential direction of the cooling holes is in the same direction as the fuel/air swirl created by the combustor fuel nozzles.

6. The combustor of claim 4 wherein the tangential direction of the cooling holes is in a direction opposite to that created by the fuel/air swirl of the combustor fuel nozzles.

* * * * *